Oct. 6, 1959  E. J. HART  2,907,598
LONGITUDINALLY ADJUSTABLE TELESCOPIC BRACE
Filed May 25, 1956
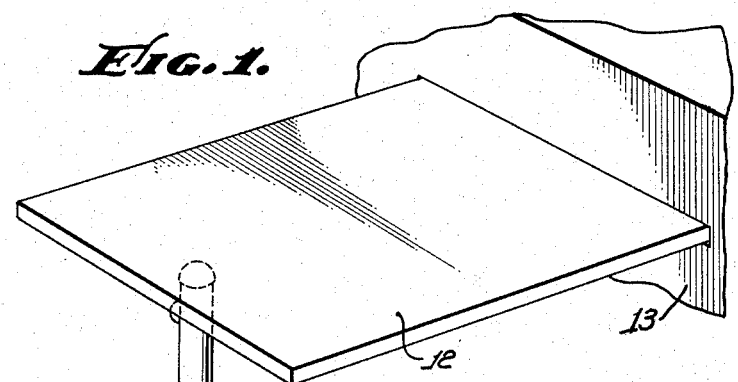
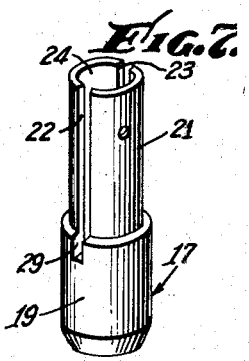
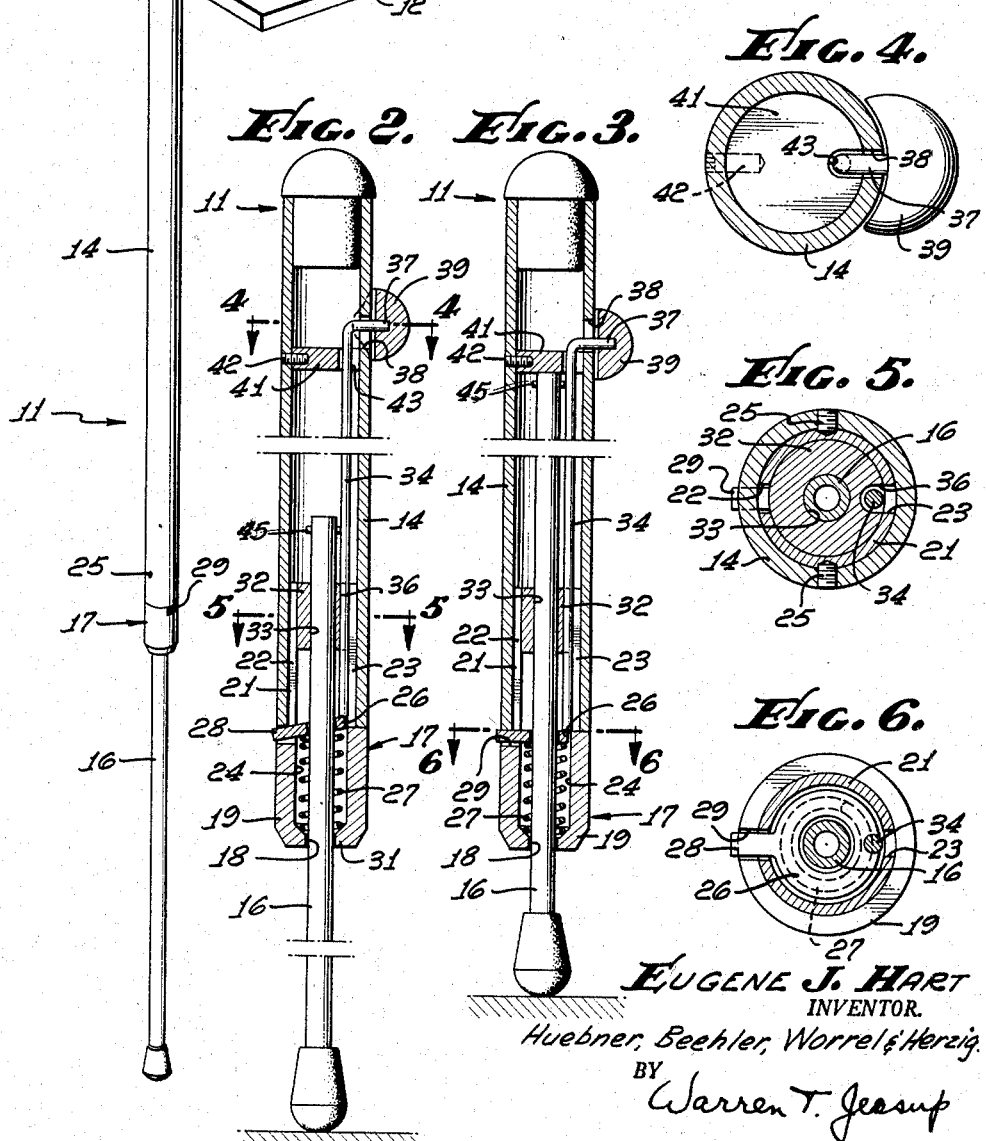
EUGENE J. HART
INVENTOR.
Huebner, Beehler, Worrel & Herzig
BY
Warren T. Jessup
ATTORNEYS.

United States Patent Office 2,907,598
Patented Oct. 6, 1959

2,907,598

LONGITUDINALLY ADJUSTABLE TELESCOPIC BRACE

Eugene J. Hart, Los Angeles, Calif.

Application May 25, 1956, Serial No. 587,395

3 Claims. (Cl. 287—58)

This invention relates to a longitudinally adjustable telescoping brace, and has particular reference to such a brace having an automatic locking mechanism that may be readily released for adjusting the length of the brace.

It is an object of this invention to provide an improved longitudinally adjustable brace having a readily accessible and operable release mechanism.

It is another object of this invention to provide improved and simplified structure for frictionally binding the two telescoping members of the brace into firm engagement with each other.

It is another object of this invention to provide a longitudinally adjustable brace member which may readily be extended by manual operation of an operating tab, which will withstand a longitudinal compressive force many times its own weight, and which at the same time may be readily released for shortening by operation of the operating tab.

In accordance with these and other objects which will become apparent hereinafter, a preferred form of the present invention is illustrated in the accompanying drawing wherein:

Fig. 1 is a perspective view of the brace of the present invention, shown in use bracing a deck extension as for example, a typewriter shelf.

Fig. 2 is a longitudinal foreshortened section of the brace;

Fig. 3 is a view similar to Fig. 2, illustrating the brace in shortened position;

Fig. 4 is a cross section taken on line 4—4 of Fig. 2;

Fig. 5 is a cross section taken on line 5—5 of Fig. 2; and,

Fig. 6 is a cross section taken on line 6—6 in Fig. 3.

Figure 7 is a perspective view of one of the parts of the present invention.

Referring to the drawing, the adjustable brace is shown at 11, being used to brace or support a typewriter shelf 12 extending from a desk 13.

The brace comprises essentially a tube 14 within which reciprocably telescopes an elongate member or leg 16. The leg 16 may be tubular as shown, or may, if desired, be solid. As shown in Figs. 2 and 3, the external diameter of the leg 16 is appreciably smaller than the internal diameter of the tube 14, for the purpose of accommodating, in the annular space therebetween, various operating parts of the brace.

Secured in the lower end of the tube 14 is a bearing member 17, having a bore 18 through which the leg 16 passes. The bore 18 serves as a linear bearing for the leg 16 in its telescoping reciprocation. The bearing member 17 consists of a lower portion 19 located beneath the lower edge of the tube 14 proper and having an external diameter flush with that of the tube 14, and an integral upper portion 21, which is externally relieved as shown in Fig. 2 that is, portion 21 is of a diameter to fit in the lower end of tube 14. The upper portion 21 has a pair of longitudinal slots 22 and 23 formed therein on opposite sides thereof, for purposes to be described hereinafter.

The bearing member 17 is secured in place by a pair of set screws 25 threaded through the tube 14 and into the upper portion 21 of the bearing member.

The bore 18 is enlarged internally thereof as shown at 24 for the purpose of accommodating a locking washer 26 and a biasing spring 27. The washer 26 is disposed within the bore 24 and circumjacent the leg 16, and is pivotally mounted with respect to the tube 14 by means of a tab 28. The tab 28 extends radially outward below the lower edge of the tube 14 proper, and resides in a notch 29 which constitutes in effect an extension of the slot 22 into the lower portion 19 of the bearing member 17.

The spring 27 likewise resides in the bore enlargement 24 circumjacent the leg 16, and is compressed between the washer 26 and an inwardly extending shoulder 31 forming the lower wall or end of the enlarged bore 24. In the normal or unoperated position shown in Fig. 2, the spring 27 biases the washer 26 upwardly and counterclockwise about a pivot point represented by the lower edge of the tube 14 proper, thereby canting the washer into frictionally binding engagement against the leg 16. When a longitudinal compressive force is applied to the brace 11, as for example when a load is applied to the top, as shown in Fig. 1, the washer 27, whose internal diameter is sufficiently greater than the external diameter of the leg 16 to permit appreciable canting, as shown in Fig. 2, is driven into harder frictional binding engagement with the leg 16. This serves to prevent the leg 16 from telescoping inward or upward into the tube 14. Actual tests have established that a 4¾ oz. brace 11 constructed in accordance with the present invention can withstand a load of over 400 lbs. without giving way.

The upper end of the bore enlargement 24 is closed by a plug 32 having a bore 33 therein forming a linear bearing surface for the leg 16. The bore 33 and the lower end of the bore 18 serve as bearing guides for the leg 16 to prevent it from canting within the tube 14.

To permit the washer 26 to be disengaged from its binding engagement with the leg 16, an operating rod 34 is provided which extends longitudinally within the annular space between the leg 16 and tube 14. The lower end of the rod 34 reciprocates in a groove 36 formed in the side of the plug 32 and forming an inward extension of the slot 23. The rod 34 rests lightly atop the right hand side of the washer 26 (Fig. 2), and is thus in position, when actuated, to press that side of the washer down and release it from its binding engagement with the leg 16, as shown in Fig. 3.

The upper end of the rod 34 extends into the upper reaches of the tube 14 and has a perpendicular tab 37 formed thereon extending outwardly of the tube 14 through a longitudinal slot 38. A knob 39 is secured to the end of the tab 37 to enable it to be more comfortably operated by hand.

In order to limit inward telescoping of the leg 16 into the tube 14, a transverse stop member 41 is secured within the tube 14 by a set screw 42 and serves to stop the upper end of the leg 16 as shown in Fig. 3. The member 41 is provided on its periphery with a groove 43 which allows passage of the upper end of the rod 34 as shown in Fig. 2. The groove 43 thus serves as a guide member for the upper end of the rod 34. Outward telescoping of leg 16 is limited by transverse pin 45 in the upper end of leg 16 which is engageable on outward movement with plug 32.

The brace 11 is used as follows: The tab 37 is pressed downward to release the washer 26, and the two parts 14 and 16 are then telescoped together. The tab 37 is released, allowing the spring 27 to press the washer 26 into binding engagement with the leg 16. The spring 27 has sufficient force to hold the leg 16 within the tube 14 against the force of gravity.

The brace 11 is then placed beneath the shelf 12 and the upper end is pressed firmly upward into engagement with the bottom surface of the shelf 12. The tab 37 is then pressed downward, releasing the washer 26 and allowing the leg 16 to drop downward to the floor. The tab 37 is then released and the brace 11 is left in place. The weight of the typewriter or other object on the shelf 12 pressing down on the brace 11 serves to bind the washer 26 still more firmly against the leg 16, thus preventing the brace from telescoping.

While the instant invention has been shown and described herein in what is conceived to be the most practical and preferred embodiment, it is recognized that departures may be made therefrom within the scope of the invention which is therefore not to be limited to the details disclosed herein, but is to be accorded the full scope of the claims.

What is claimed is:

1. Longitudinally adjustable telescoping brace comprising a tube, a leg reciprocably and telescopically mounted in said tube, said leg having an external diameter appreciably smaller than the internal diameter of said tube, thereby leaving an annular space between said leg and said tube, said tube having a bearing member secured in the lower end of said tube and having a bore therein through which said leg passes, said bore serving as a linear bearing for said leg in its telescoping reciprocation, said bearing member having a lower portion of larger diameter abutting the lower end of said tube and an upper portion of smaller diameter to fit within said tube, said upper portion having a pair of longitudinal slots therein on opposite sides thereof, means defining a notch in said lower portion aligned with one of said slots, means defining an enlarged bore in said bearing above said first bore, a washer circumjacent said leg and disposed within said enlarged bore, said washer having an outwardly extending tab residing in said notch and being retained therein by said lower end of said tube, a compression spring disposed beneath said washer and compressed between said washer and said lower portion of said bearing member, said washer tab serving as a pivot member permitting said washer to pivot asymetrically about said leg, thereby to be canted into binding engagement with said rod by the bias of said spring, an operating rod disposed in said annular space between said leg and said tube, said rod passing downwardly in the other of said slots to engage said washer and enable said washer to be disengaged from said leg against the bias of said spring, said operating rod extending to the upper reaches of said tube and having a tab extending outwardly through a slot in said tube to permit said rod to be manually pressed downward into engagement with said washer.

2. A longitudinally adjustable brace comprising a tube, a leg reciprocably and telescopically mounted in said tube, said leg having an external diameter appreciably smaller than the internal diameter of said tube, thereby leaving an annular space between said leg and said tube, a bearing member secured in the lower end of said tube, having a bore therein through which said leg passes, said bearing member having a lower portion of larger diameter abutting the lower end of said tube and an upper portion of smaller diameter to reside within said tube, said upper portion having a longitudinal slot therein; means defining a notch in said lower portion aligned with said slot and coacting with said lower end of said tube to define an opening; means defining an enlarged bore in said bearing and above said first mentioned bore; a plug member fixed in said enlarged bore, spaced from said first mentioned bore, and having a bore and an external longitudinal groove, said first and last mentioned bores serving as aligned bearings for said leg in its telescoping reciprocation; a locking washer circumjacent to said leg and disposed within said enlarged bore, said washer having an outwardly extending tab residing in said opening; a compression spring disposed beneath said washer and compressed between said washer and said lower portion of said bearing member, said washer tab serving as a pivot member permitting said washer to pivot asymmetrically about said leg, thereby to be canted into binding engagement with said leg by the bias of said spring; an operating rod disposed in said annular space between said leg and said tube, said rod passing downwardly and through said plug member groove to engage said washer and enable said washer to be disengaged from said leg against the bias of said spring, said operating rod extending upwardly in said tube and having a tab extending outwardly through a slot in said tube to permit said rod to be manually pressed downward into engagement with said washer.

3. A longitudinally adjustable brace comprising a tube having lower and upper ends, a bearing member fixed in said lower end and having upper and lower portions of different diameter, said lower portion having an outer diameter substantially flush with the outer diameter of said tube and at said upper portion having a diameter to fit within said tube, said upper portion having a slot, said lower portion having a notch aligned with said slot, said notch coacting with said lower end of said tube to define an opening, means defining a bore in the lower end of said bearing, means defining an enlarged bore in said bearing and communicating between said first bore and the upper exterior of the bearing, a plug member fixed in said upper portion of said bearing and in said enlarged bore, means defining a bore in said plug member substantially in alignment with said first mentioned bore, a leg reciprocally and telescopically mounted in said tube and journaled in said first and last mentioned bores, locking means disposed in said enlarged bore and circumjacent said leg, pivot means on said locking means extending in said opening, compression spring means engaging said locking means or biasing the locking means into locking engagement with said leg, and means operatively associated with said locking means for selectively manually disengaging said locking means from said leg thereby permitting said leg to telescope inwardly or outwardly of said tube.

References Cited in the file of this patent

UNITED STATES PATENTS

| | | |
|---|---|---|
| 388,218 | Patzer | Aug. 21, 1888 |
| 389,577 | Kintz | Sept. 18, 1888 |
| 2,434,598 | Stegall | Jan. 13, 1948 |
| 2,483,395 | Benson | Oct. 4, 1949 |
| 2,495,674 | Lewis | Jan. 24, 1950 |
| 2,671,355 | Hawkins | Mar. 9, 1954 |
| 2,806,723 | Fairclough | Sept. 17, 1957 |